(12) United States Patent
Shintani

(10) Patent No.: US 8,137,005 B2
(45) Date of Patent: Mar. 20, 2012

(54) LENS BARREL AND CAMERA

(75) Inventor: Dai Shintani, Osaka (JP)

(73) Assignee: Panasonic Corporation, Osaka (JP)

( * ) Notice: Subject to any disclaimer, the term of this patent is extended or adjusted under 35 U.S.C. 154(b) by 686 days.

(21) Appl. No.: 12/250,783

(22) Filed: Oct. 14, 2008

(65) Prior Publication Data

US 2009/0102958 A1 Apr. 23, 2009

(30) Foreign Application Priority Data

Oct. 19, 2007 (JP) ................................ 2007-272106

(51) Int. Cl.
*G03B 17/04* (2006.01)
(52) U.S. Cl. ......................... 396/348; 359/699; 348/557
(58) Field of Classification Search .................. 348/357, 348/335; 396/348; 359/699
See application file for complete search history.

(56) References Cited

U.S. PATENT DOCUMENTS

| | | | | |
|---|---|---|---|---|
| 2002/0136556 A1* | 9/2002 | Nomura et al. | ............... | 396/458 |
| 2004/0130803 A1* | 7/2004 | Iwasaki | ........................ | 359/700 |
| 2005/0088757 A1* | 4/2005 | Tsuzuki | ........................ | 359/704 |
| 2005/0200975 A1* | 9/2005 | Makii et al. | .................... | 359/696 |
| 2006/0193625 A1* | 8/2006 | Nomura | ........................ | 396/349 |
| 2008/0190241 A1* | 8/2008 | Kuwahara et al. | .............. | 74/838 |

FOREIGN PATENT DOCUMENTS

| | | |
|---|---|---|
| JP | 11-218663 | 8/1999 |
| JP | 2000-194045 | 7/2000 |
| JP | 2003-75710 | 3/2003 |
| JP | 2004-144790 | 5/2004 |
| JP | 2004-177812 | 6/2004 |
| JP | 2005-157305 | 6/2005 |
| JP | 2005-258359 A | 9/2005 |

OTHER PUBLICATIONS

Japanese Office action dated Aug. 9, 2011.

\* cited by examiner

*Primary Examiner* — W. B. Perkey
*Assistant Examiner* — Linda B Smith
(74) *Attorney, Agent, or Firm* — Pearne & Gordon LLP

(57) ABSTRACT

A lens barrel has a drive frame, a first lens frame, a zoom motor, and a control device. The drive frame has three first cam grooves. The first lens frame has cam pins inserted into the first cam grooves. The zoom motor rotationally drives the drive frame. The control device limits the drive range of the zoom motor so that the cam pins do not stop near the wide-angle position of the imaging region.

16 Claims, 12 Drawing Sheets

LENS BARREL AND CAMERA

CROSS-REFERENCE TO RELATED APPLICATIONS

The application claims priority to Japanese Patent Application No. JP2007-272106 filed on Sep. 19, 2007. The entire disclosure of Japanese Patent Application No. JP2007-272106 is hereby incorporated herein by reference.

BACKGROUND OF THE INVENTION

1. Field of the Invention

The present invention relates to a lens barrel, and more particularly relates to a lens barrel for supporting a zoom lens system with which the focal distance can be changed.

2. Description of the Related Art

Recent years have witnessed the increased popularity of digital cameras, in which a CCD (charge coupled device), CMOS (complementary metal-oxide semiconductor) sensor, or other such imaging element is used to convert an optical image into an electrical signal, and the electrical signal is digitized and recorded.

In the field of digital cameras, the overall size of the camera needs to be reduced in order to make the product more portable. More specifically, a more compact lens barrel has been proposed in order to make the camera body thinner, as disclosed in Japanese Laid-Open Patent Application 2005-157305.

SUMMARY OF THE INVENTION

However, with the lens barrel disclosed in Japanese Laid-Open Patent Application 2005-157305, although modifications have been made to the shape of the cam grooves, no corresponding drive system is proposed for the lens barrel. Consequently, although there is a region that does not fulfill the desired optical performance between the wide-angle end and the telephoto end of the imaging optical system, there is the possibility that this region will be used during imaging.

It is an object of the present invention to provide a lens barrel that can be made more compact while maintaining the desired optical performance.

The lens barrel according to a first aspect of the present invention is a lens barrel for supporting an imaging optical system, including a cylindrical first support frame, a cylindrical second support frame, a drive part, and a control part. The first support frame has on an inner or outer peripheral face thereof at least three first guide grooves disposed aligned in the circumferential direction. The second support frame is provided on the inner or outer peripheral side of the first support frame and has at least three first pins inserted in the first guide grooves. The drive part drives either the first or second support frame in the rotational direction. The control part controls operation of the drive part. The first guide grooves have a retracted region and an imaging region. The retracted region is one in which the relative positions of the first and second support frames are changed from a retracted position, at which the overall size of the first and second support frames in a direction along the optical axis of the imaging optical system is shortest, to a wide-angle position, corresponding to the wide-angle end of the imaging optical system. The imaging region is one in which the relative positions of the first and second support frames are changed from the wide-angle position to a telephoto position corresponding to the telephoto end of the imaging optical system. The control part limits the drive region of the drive part so that the first pins do not stop in the region included in the imaging region and disposed around the wide-angle position and on the telephoto position side of the wide-angle position.

With this lens barrel, since the stopping of the first pins in the region included in the first guide grooves and disposed around the wide-angle position is limited by the control part, this prevents the region disposed around the wide-angle position from being used during imaging. Therefore, even though the part included in the imaging region and disposed around the wide-angle position has a shape that does not fulfill the optical performance of the imaging optical system, the shape of the part included in the imaging region and disposed around the wide-angle position is not limited by optical design. Accordingly, the shape of the part included in the imaging region and disposed around the wide-angle position can be gently curved irrespective of optical design, allowing the dimension of the first guide grooves along the optical axis to be shortened, and affording an overall size that is smaller.

The lens barrel according to a second aspect of the present invention is the lens barrel according to the first aspect of the present invention, wherein the wide-angle position is provided to an inclined region. The inclined region is a region included in the retracted region and/or the imaging region, and guides the first pins so that the second support frame moves along the optical axis with respect to the first support frame.

The lens barrel according to a third aspect of the present invention is the lens barrel according to the second aspect of the present invention, wherein the retracted region has a first region inclined to the same side as the inclined region with respect to the rotational direction. The inclination angle of the inclined region with respect to the rotational direction is smaller than the inclination angle of the first region with respect to the rotational direction.

The lens barrel according to a fourth aspect of the present invention is the lens barrel according to the third aspect of the present invention, wherein the imaging region has a usable region, a wide-angle position, and a drive limiting region. The usable region includes a telephoto position and can be used for changing the magnification ratio of the imaging optical system within the range of the desired optical performance. The drive limiting region is a region provided in between the wide-angle position and the usable region. The region of the usable region adjacent to the drive limiting region is inclined to the opposite side from that of the inclined region with respect to the rotational direction.

The lens barrel according to a fifth aspect of the present invention is the lens barrel according to any of the first to fourth aspects of the present invention, further comprising a third support frame. The third support frame is provided to the inner or outer peripheral side of the first support frame and has at least three second pins disposed aligned in the rotational direction. The first support frame has at least three second guide grooves disposed aligned in the rotational direction and in which the second pins are inserted. A first maximum dimension by which the first pins move along the optical axis when guided by the first guide grooves is substantially the same as a second maximum dimension by which the second pins move along the optical axis when guided by the second guide grooves.

The phrase "first maximum dimension by which the first pins move along the optical axis when guided by the first guide grooves is substantially the same as a second maximum dimension by which the second pins move along the optical axis when guided by the second guide grooves" here encompasses a case in which the first maximum dimension and the second maximum dimension are the same, as well as a case in which the first maximum dimension and the second maximum dimension are different within a range that still allows the lens barrel to be made smaller.

The camera according to a sixth aspect of the present invention includes an imaging optical system, the lens barrel according to any of the first to fifth aspects of the present invention, and an imaging part configured to convert an optical image formed by the imaging optical system into an image signal.

Because this camera is equipped with the lens barrel according to any of the first to fifth aspects of the present invention, the camera can be made smaller while maintaining the desired optical performance.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

1: Overview of Digital Camera

Figure 1:
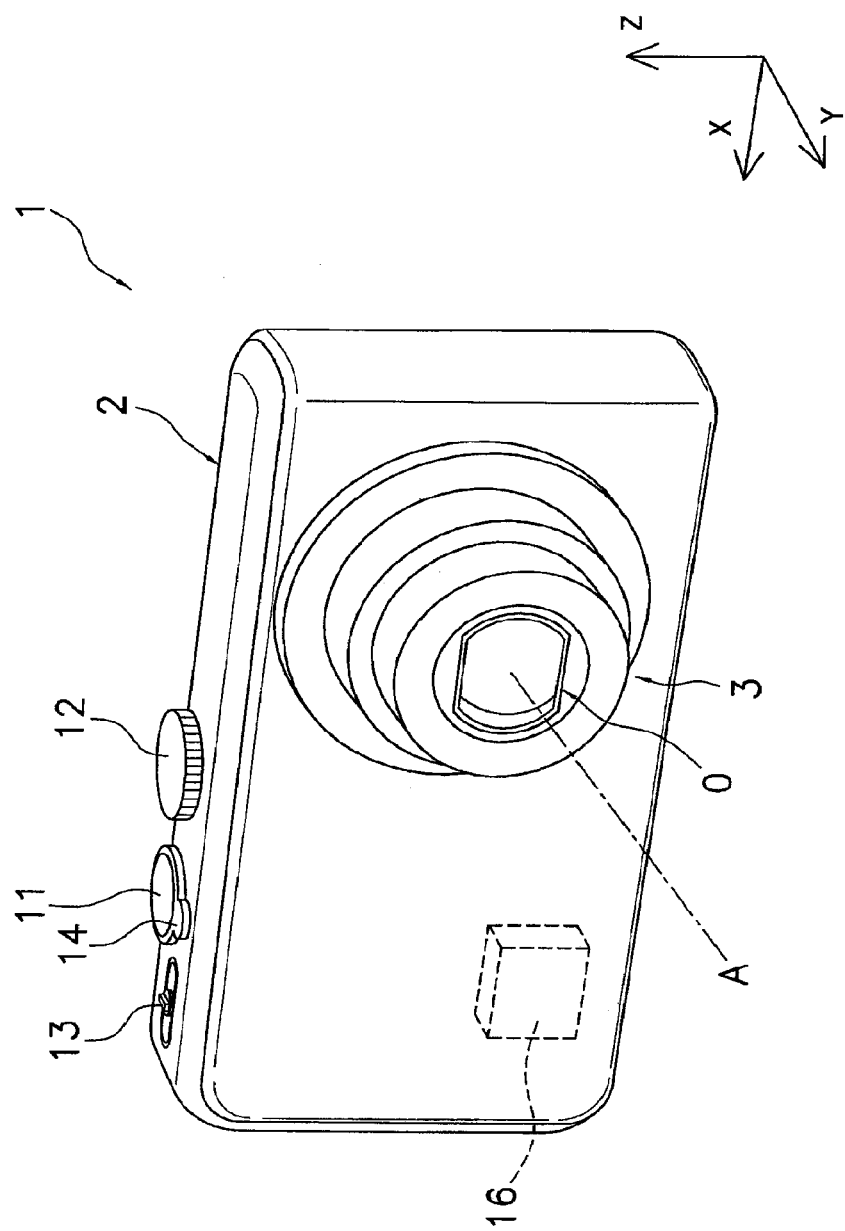
FIG. 1 is an oblique view of a digital camera.
Figure 2:
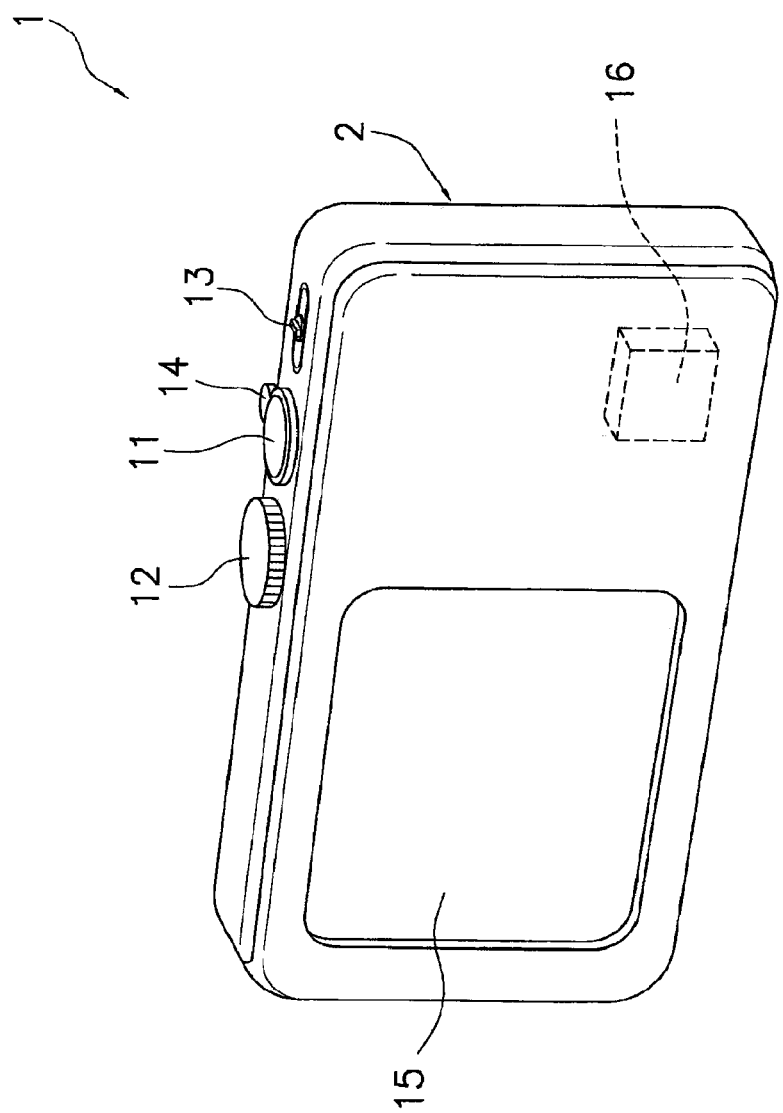
FIG. 2 is an oblique view of a digital camera.

A digital camera 1 according to an embodiment of the present invention will now be described through reference to FIGS. 1 and 2. FIGS. 1 and 2 are simplified oblique views of the digital camera 1. FIG. 1 shows a lens barrel 3 in its imaging state.

The digital camera 1 is a camera for capturing an image of a subject. A multi-stage telescoping lens barrel 3 is mounted to make the camera more compact and afford greater magnification. The most salient features of the digital camera 1 are drive control and the shape of the cam grooves. These features will be discussed below.

In the following description, the six sides of the digital camera 1 are defined as follows. The side facing the subject when an image is being captured by the digital camera 1 is called the front face, and the face on the opposite side is called the rear face. When an image is captured such that the top and bottom in the vertical direction of the subject match up with the top and bottom in the short-side direction of the rectangular image being captured by the digital camera 1 (the aspect ratio (the ratio of long to short sides) is generally 3:2, 4:3, 16:9, etc.), the side facing upward in the vertical direction (subject image on the lower side) is called the top face, and the opposite side (subject image on the upper side) is called the bottom face. The side that is on the left when viewed from the subject side is called the left face, and the opposite side is called the right face. The above definitions are not intended to limit the usage orientation of the digital camera 1.

Based on the above definitions, FIG. 1 is an oblique view illustrating the front face, top face, and right face.

The same definitions apply not only to the six sides of the digital camera 1, but also to the six sides of the various constituent members disposed on the digital camera 1. Specifically, the above definitions are applied to the six sides of the various constituent members in their state of being disposed on the digital camera 1.

As shown in FIG. 1, a three-dimensional perpendicular coordinate system is defined, having a Y axis parallel to the optical axis A of an imaging optical system O (discussed below). Based on this definition, the direction facing the front face side from the rear face side along the optical axis is called the Y axial direction positive side, the direction facing the left face side from the right face side and perpendicular to the optical axis A is called the X axial direction positive side, and the direction facing the top face side from the bottom face side and perpendicular to the X and Y axes is called the Z axial direction positive side.

The drawings will be described below using this XYZ coordinate system as a reference. That is, the X axial direction positive side, the Y axial direction positive side, and the Z axial direction positive side in the drawings each refer to the same respective direction.

2: Overall Configuration of Digital Camera

As shown in FIGS. 1 and 2, the digital camera 1 mainly includes a camera main body 2, an imaging optical system O for forming an optical image of a subject, and a lens barrel 3 for movably supporting the imaging optical system O.

The imaging optical system O is made up of a plurality of lens groups, and the lens groups are disposed in a state of being aligned in the Y axial direction. The lens barrel 3 is a multi-stage telescoping type, and is supported by the camera main body 2. The lens groups are supported by the lens barrel 3 so as to be capable of relative movement in the Y axial direction. The configuration of the lens barrel 3 will be described in detail below.

The lens barrel 3 is provided with a CCD unit 21 as an imaging part for performing opto-electrical conversion on optical images. The camera main body 2 houses an image recording part 16 for recording images captured by the CCD unit 21. A liquid crystal monitor 15 for displaying images captured by the CCD unit 21 is provided on the rear face of the camera main body 2.

A release button 11, a control dial 12, a power switch 13, and a zoom adjusting lever 14 are provided to the top face of the camera main body 2 so that the user can control the imaging operation, etc. The release button 11 is used by the user to input the imaging timing. The control dial 12 is used by the user to make various settings related to imaging operation. The power switch 13 is used by the user to turn the digital camera 1 on or off. The zoom adjusting lever 14 is used by the user to adjust the zoom magnification, and is able to rotate around the release button 11 within a specific angular range.

FIGS. 1 and 2 show only the main configuration of the digital camera 1. Therefore, the digital camera 1 may have a configuration other than what is discussed above.

3: Configuration of Lens Barrel

The overall configuration of the lens barrel 3 will be described through reference to FIG. 3, which is an exploded oblique view of the lens barrel 3.

Figure 3:
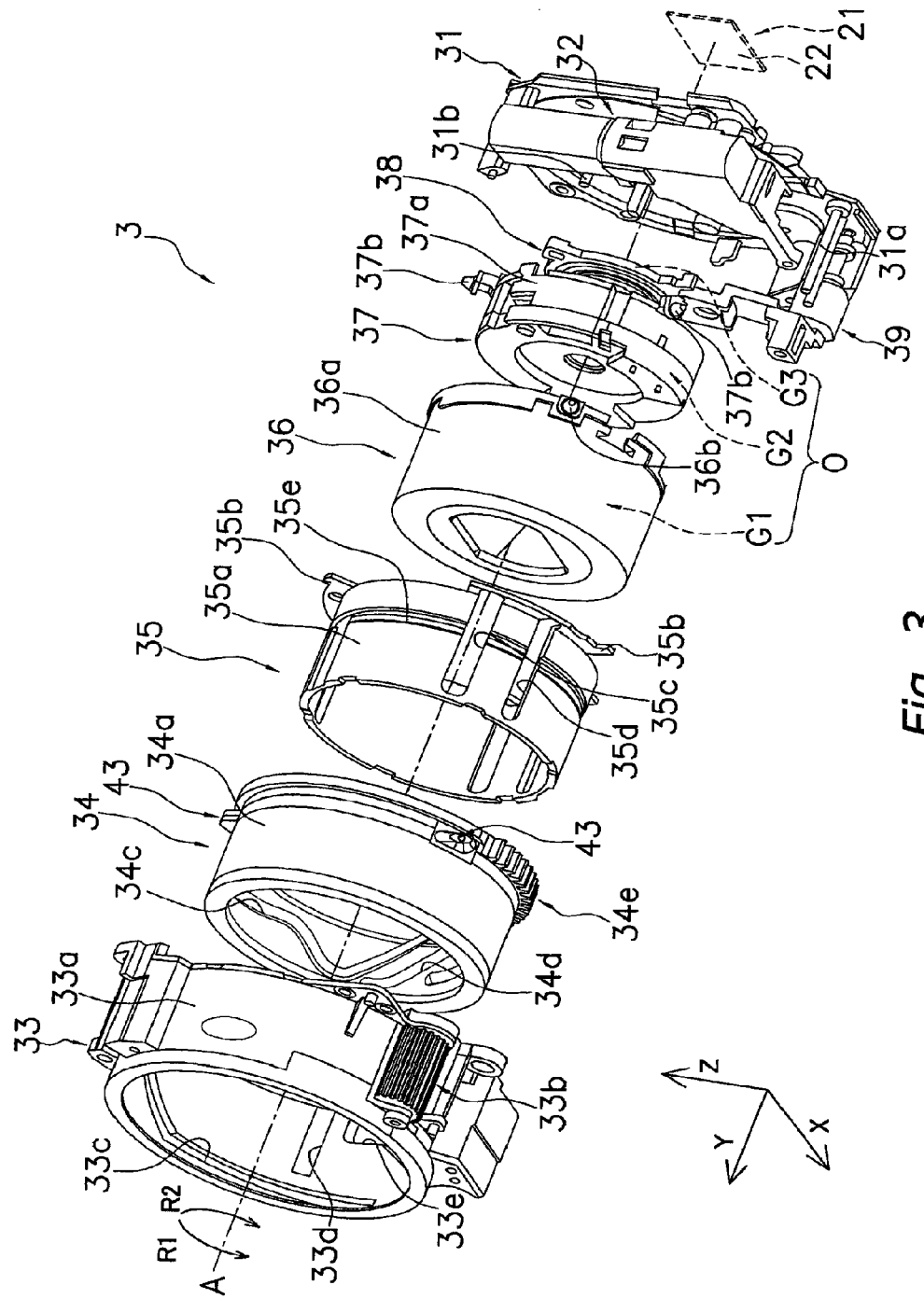
FIG. 3 is an exploded oblique view of a lens barrel.

As shown in FIG. 3, the lens barrel 3 mainly includes a base plate 31 that is fixed to the camera main body 2, a zoom motor 32 that serves as a drive part and is fixed to the base plate 31, a stationary frame 33 that holds various frames between itself and the base plate 31, a drive frame 34 that serves as a first support frame and to which the drive force from the zoom motor 32 is inputted, and a straight-movement frame 35 that is supported by the stationary frame 33 so as to be capable of movement in the Y axial direction. A CCD 22 of the CCD unit 21 is attached to the base plate 31. An example of the zoom motor 32 is a DC motor.

The lens barrel 3 further includes a first lens frame 36 serving as a second support frame that supports a first lens group G1, a second lens frame 37 serving as a third support frame that supports a second lens group G2, and a third lens group 38 that supports a third lens group G3. The first lens group G1 is a lens group that overall has negative power, for example, and takes in light from the subject. The second lens group G2 is a lens group that overall has positive power, for example. The third lens group G3 is a lens group having positive power for adjusting the focal point, for example. The first lens group G1, second lens group G2, and third lens group G3 constitute the imaging optical system O.

3.1: Stationary Frame

The stationary frame 33 is a member for guiding the drive frame 34, and along with the base plate 31 constitutes a member on the fixed side of the lens barrel 3. The stationary frame 33 is fixed by a screw to the base plate 31. The stationary frame 33 mainly includes a substantially cylindrical stationary frame main body 33a that makes up the main part, and a drive gear 33b that is rotatably supported by the stationary frame main body 33a.

The stationary frame main body 33a is fixed to the base plate 31, and the drive frame 34 is disposed on its inner peripheral side. The drive gear 33b is a member for transmitting the drive force of the zoom motor 32 to the drive frame 34, and meshes with a gear (not shown) of the zoom motor 32. On the inner peripheral side of the stationary frame main body 33a are formed three cam grooves 33c for guiding the drive frame 34, and three straight-movement grooves 33d for guiding the straight-movement frame 35. The cam grooves 33c are disposed at a substantially uniform pitch in the circumferential direction. The straight-movement grooves 33d extend in the Y axial direction and are disposed at a substantially uniform pitch in the circumferential direction.

3.2: Drive Frame

The drive frame 34 is a member for guiding the first lens frame 36 and the second lens frame 37, and is disposed on the inner peripheral side of the stationary frame 33. The drive frame 34 mainly includes a substantially cylindrical drive frame main body 34a disposed on the inner peripheral side of the stationary frame main body 33a.

Figure 12:
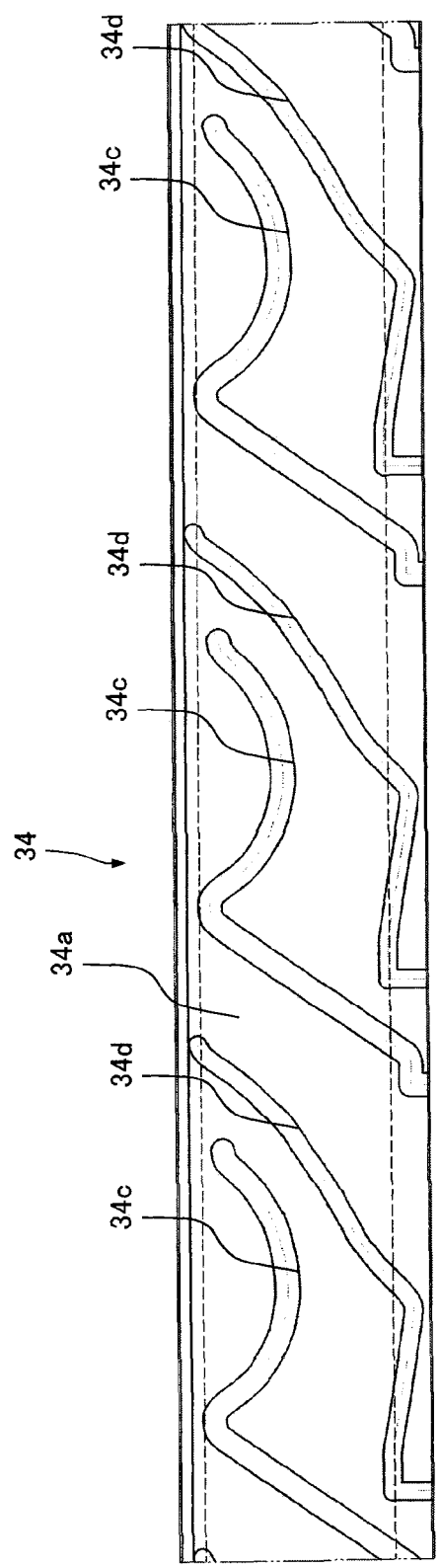
FIG. 12 is a development of an inner peripheral surface of the drive frame.

Three cam pins 43 are provided as cam follower members on the outer peripheral side of the drive frame main body 34a, and three first cam grooves 34c and three second cam grooves 34d are formed on the inner peripheral side. The first cam grooves 34c serve to guide the first lens frame 36. The second cam grooves 34d serve to guide the second lens frame 37. The three cam pins 43 are disposed at a substantially constant pitch in the circumferential direction, and engage with the three cam grooves 33c of the stationary frame 33 (see FIG. 12). That is, the drive frame 34 is supported by the stationary frame 33 via the cam pins 43.

A gear part 34e is formed on the outer peripheral side of the drive frame main body 34a. The gear part 34e meshes with the drive gear 33b of the stationary frame 33. As a result, the drive force of the zoom motor 32 is transmitted through the drive gear 33b to the drive frame 34.

The drive frame 34 is driven around the optical axis A (directions R1 and R2) by the drive force of the zoom motor 32. For example, when it moves from its retracted state to its imaging state, the drive frame 34 is driven to the R1 side by the zoom motor 32. As a result, the cam pins 43 move along the cam grooves 33c of the stationary frame 33, and the drive frame 34 moves to the Y axial direction positive side with respect to the stationary frame 33. When the movement is from the imaging state to the retracted state, the drive frame 34 is driven to the R2 side by the zoom motor 32. As a result, the drive frame 34 moves to the Y axial direction negative side with respect to the stationary frame 33.

Thus, the drive frame 34 is able to move in the Y axial direction while rotating with respect to the stationary frame 33, according to the shape of the cam grooves 33c.

3.3: Straight-Movement Frame

The straight-movement frame 35 is a member for preventing the first lens frame 36 from rotating with respect to the stationary frame 33, and is disposed on the inner peripheral side of the drive frame 34. The straight-movement frame 35 mainly includes a cylindrical straight-movement frame main body 35a and three straight movement pins 35b formed on the outer peripheral side of the straight-movement frame main body 35a.

The straight-movement pins 35b are disposed on the Y axial direction negative side of the straight-movement frame main body 35a so as not to interfere with the drive frame 34, and engage with the straight-movement grooves 33d of the stationary frame 33. Specifically, the straight-movement frame 35 is supported by the stationary frame 33 so as to be capable of straight movement in the Y axial direction.

Also, a bayonet groove 35e is formed on the outer peripheral side of the straight-movement frame main body 35a. A bayonet tab (not shown) formed on the inner peripheral side of the drive frame 34 engages in the bayonet groove 35e. This allows the straight-movement frame 35 to move integrally in the Y axial direction and to rotate with respect to the drive frame 34.

Specifically, when the drive frame 34 rotates with respect to the stationary frame 33, the straight-movement frame 35 moves in the Y axial direction along with the drive frame 34, without rotating with respect to the stationary frame 33 (while rotating with respect to the drive frame 34).

Three first guide grooves 35c and three second guide grooves 35d extending in the Y axial direction are formed in the straight-movement frame main body 35a. The three first guide grooves 35c are disposed at a substantially uniform pitch in the circumferential direction, and the three second guide grooves 35d are disposed at a substantially uniform pitch in the circumferential direction. Cam pins 36b (discussed below) of the first lens frame 36 are inserted into the first guide grooves 35c. Cam pins 37b (discussed below) of the second lens frame 37 are inserted into the second guide grooves 35d. Specifically, rotation of the first lens frame 36 and the second lens frame 37 with respect to the stationary frame 33 is limited by the straight-movement frame 35. Movement of the first lens frame 36 and the second lens frame 37 in the Y axial direction is not limited by the first guide grooves 35c and the second guide grooves 35d.

3.4: First Lens Frame

The first lens frame 36 is a member for supporting the first lens group G1 movably in the Y axial direction, and is disposed on the inner peripheral side of the straight-movement frame 35. The first lens frame 36 mainly includes a first lens frame main body 36a that holds the first lens group G1 in its interior, and three cam pins 36b provided on the outer peripheral side of the first lens frame main body 36a. The cam pins 36b engage with the first cam grooves 34c of the drive frame 34 in a state of passing through the first guide grooves 35c.

When the drive frame 34 rotates with respect to the stationary frame 33, the cam pins 36b move along the first guide grooves 35c. At this point, movement of the cam pins 36b in the rotational direction is limited by the first guide grooves 35c of the straight-movement frame 35. Therefore, the cam pins 36b move only in the Y axial direction along the first guide grooves 35c and the first cam grooves 34c. Thus, the first lens frame 36 is able to move in the Y axial direction with respect to the drive frame 34, according to the shape of the first cam grooves 34c, without rotating with respect to the stationary frame 33.

3.5: Second Lens Frame

The second lens frame 37 is a member for supporting the second lens group G2 movably in the Y axial direction, and is disposed on the inner peripheral side of the straight-movement frame 35 and on the Y axial direction negative side of the first lens frame 36. The second lens frame 37 mainly includes a second lens frame main body 37a that holds the second lens group G2 in its interior, and three cam pins 37b provided on the outer peripheral side of the second lens frame main body 37a. The cam pins 37b engage with the second cam grooves 34d of the drive frame 34 in a state of passing through the second guide grooves 35d.

When the drive frame 34 rotates with respect to the stationary frame 33, the cam pins 37b move along the second guide grooves 35d. At this point, movement of the cam pins 37b in the rotational direction is limited by the second guide grooves 35d of the straight-movement frame 35. Therefore, the cam pins 37b move only in the Y axial direction along the second guide grooves 35d and the second cam grooves 34d, just as is the first lens frame 36.

Thus, the second lens frame 37 is able to move in the Y axial direction with respect to the drive frame 34, according to the shape of the second cam grooves 34d, without rotating with respect to the stationary frame 33.

3.6: Third Lens Frame

The third lens group 38 is a member for supporting the third lens group G3 movably in the Y axial direction, and is supported movably in the Y axial direction by focus shafts 31a and 31b of the base plate 31. The drive of the third lens group 38 is performed by a focus motor 39 fixed to the base plate 31. More specifically, the third lens group 38 is pressed by a spring (not shown) to the Y axial direction positive side against a nut (not shown) threaded onto a lead screw of the focus motor 39. Therefore, when the lead screw of the focus motor 39 rotates, the third lens group 38 moves along with the nut in the Y axial direction with respect to the base plate 31. The focus motor 39 is a stepping motor, for example.

To summarize the above configuration, the zoom motor 32 makes it possible for the first lens frame 36 and the second lens frame 37 to move in the direction of the optical axis A via the stationary frame 33, the drive frame 34, and the straight-movement frame 35. The focus motor 39 makes it possible for the third lens group 38 to move in the direction of the optical axis A.

Therefore, a telescoping lens barrel 3 with which the zoom magnification and focus of the imaging optical system O can be adjusted is realized by the above constitution.

4: Control Device

Figure 4:
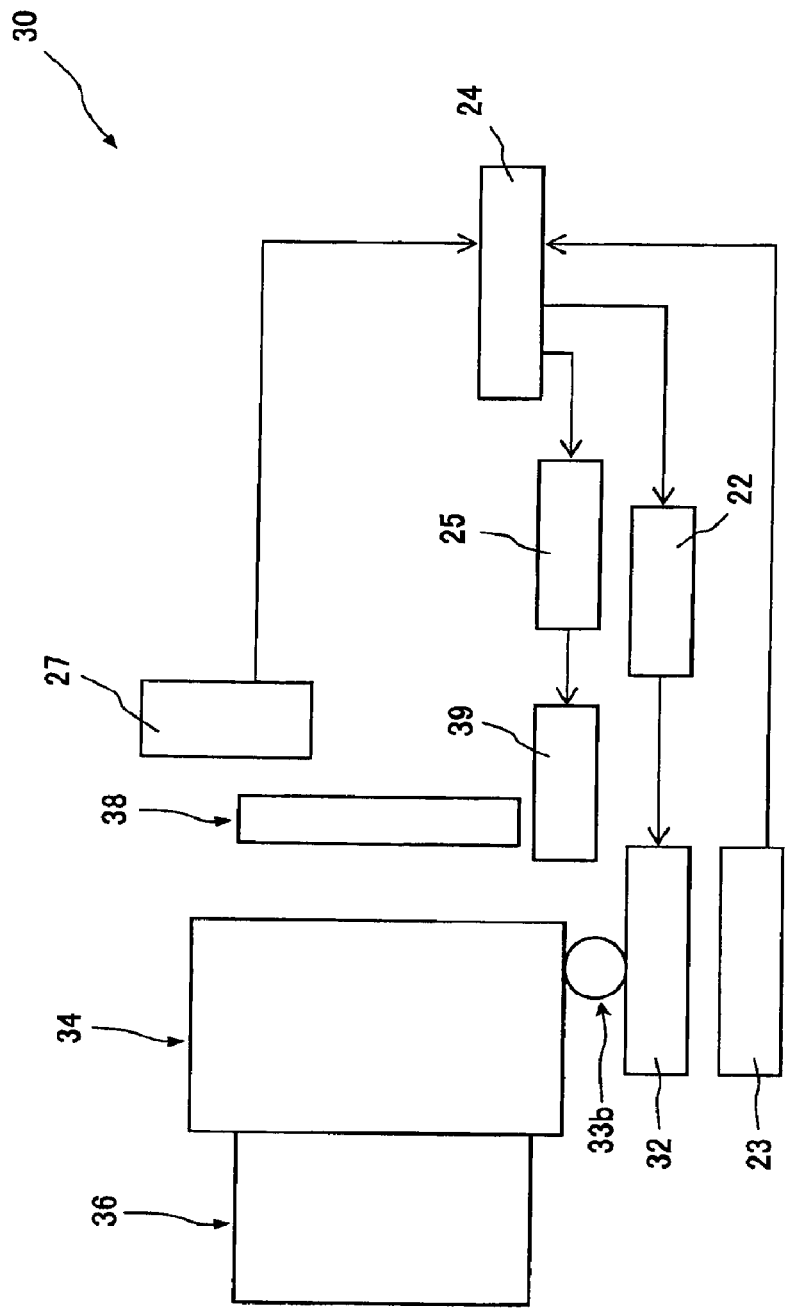
FIG. 4 is a simplified diagram of the configuration of a control device.

The digital camera 1 has a control device 30 serving as a control part configured to control the operation of the zoom motor 32, the focus motor 39, and the CCD unit 21. FIG. 4 is a block diagram of the control device 30.

As shown in FIG. 4, the control device 30 has a first motor driver 26 connected to the zoom motor 32, and an encoder 23 that detects the rotational angle of the drive frame 34. The encoder 23 outputs rotational angle information about the drive frame 34 to a microprocessor 24. The microprocessor 24 has a CPU, a RAM, and ROM, and various functions can be achieved by reading programs stored in the ROM into the CPU. For example, the microprocessor 24 recognizes the rotational angle (absolute position) of the drive frame 34 and instructs the first motor driver 26 to generate a control signal on the basis of the rotational angle information received from the encoder 23. That is, feedback control of the zoom motor 32 is carried out by the first motor driver 26, the encoder 23, and the microprocessor 24.

The control device 30 also has a second motor driver 25 connected to the focus motor 39, and a position sensor 27 that is switched on and off by a third lens frame 18. The second motor driver 25 produces control pulses for driving the focus motor 39 on the basis of commands from the microprocessor 24. The microprocessor 24 ascertains the position of the third lens group G3 by counting the control pulses when the focus motor 39 is driven. Open loop control of the focus motor 39 is carried out by the second motor driver 25 and the microprocessor 24.

The position sensor 27 detects whether or not the third lens frame 18 is in a reference position, and also serves to detect whether or not the lens barrel 3 has been retracted into the main body. More specifically, when the lens barrel 3 moves from its imaging position to its retracted position, the third lens frame 18 is guided to the Y axial direction negative side by the drive frame 34, and the third lens frame 18 stops at a position away from the nut. Since the position sensor 27 is switched on by the third lens frame 18 in this position, the microprocessor 24 can recognize whether or not the lens barrel 3 is in its retracted state on the basis of a detection signal from the position sensor 27.

The microprocessor 24 issues a command to produce a control pulse to the second motor driver 25 in order to detect the focal point on the basis of a contrast detection method. For example, as with the so-called "mountain climbing method," the third lens group G3 is moved in the direction of the optical axis A, and an image signal corresponding to the various positions of the third lens group G3 is acquired by the CCD unit 21. Contrast information corresponding to the position of the third lens group G3 is acquired by the microprocessor 24 from these image signals, and the position of the third lens group G3 corresponding to the focal state is determined by the microprocessor 24.

The microprocessor 24 issues a command to produce a control pulse of the focus motor 39 to the second motor driver 25 so that the third lens group G3 will move to the focal position. The focus motor 39 is rotationally driven by a specific angle by the control pulse produced by the second motor driver 25, and the third lens group G3 moves to the focal position. This allows the focal point of the imaging optical system O to be automatically adjusted.

5: Cam Grooves

5.1: Shape of First Cam Grooves

Figure 5:
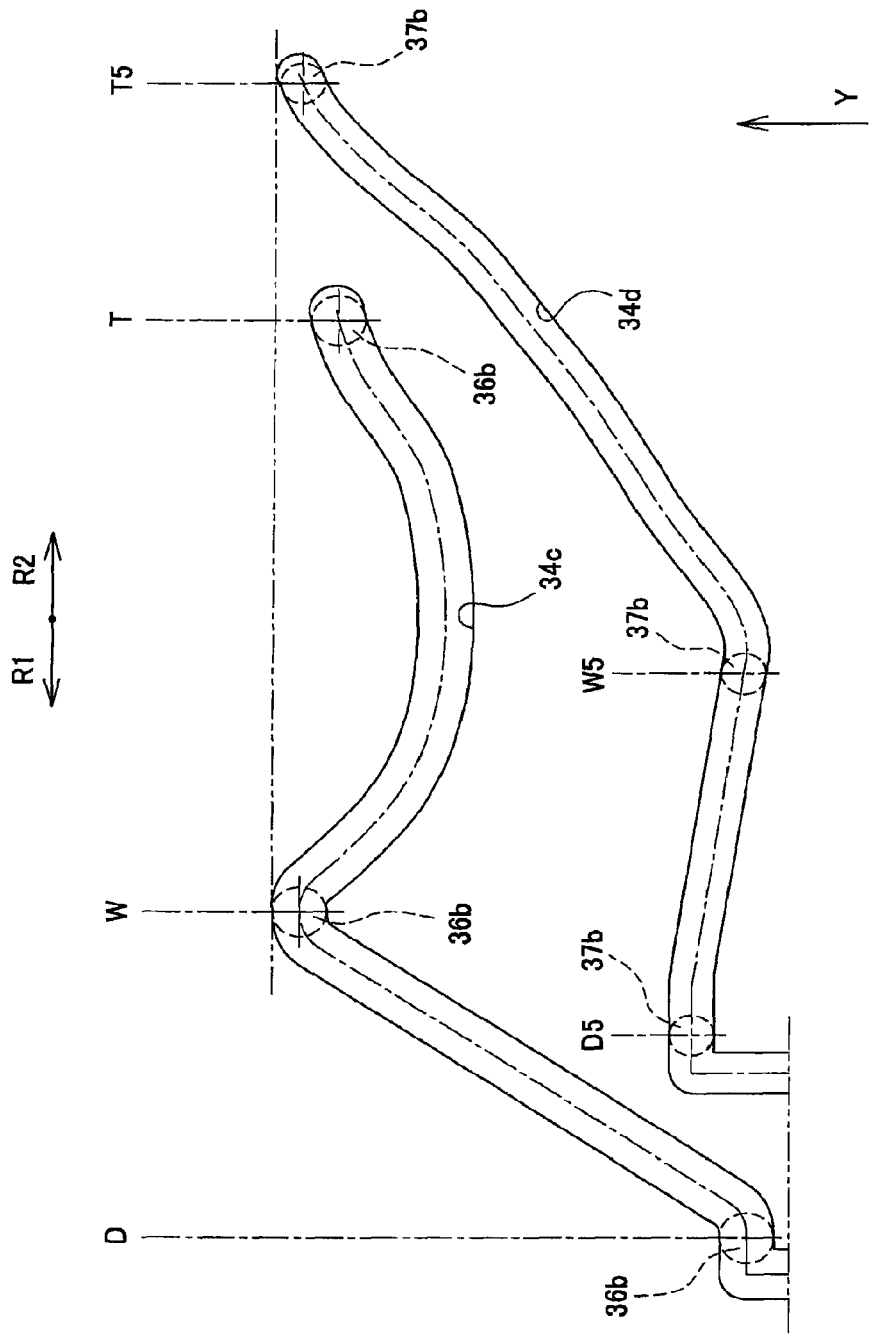
FIG. 5 is a development of first and second cam grooves of a drive frame.
Figure 6:
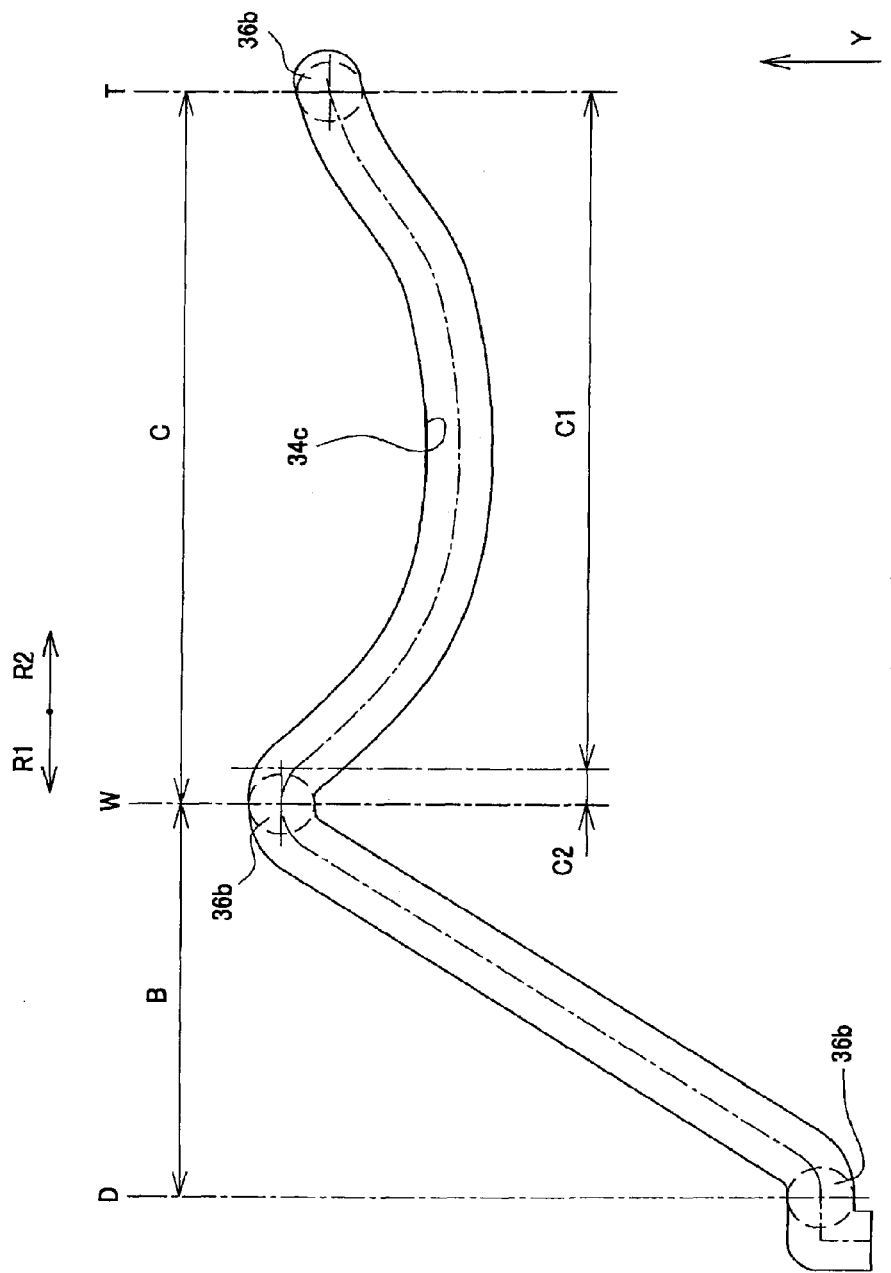
FIG. 6 is a development of the first cam groove.
Figure 7:
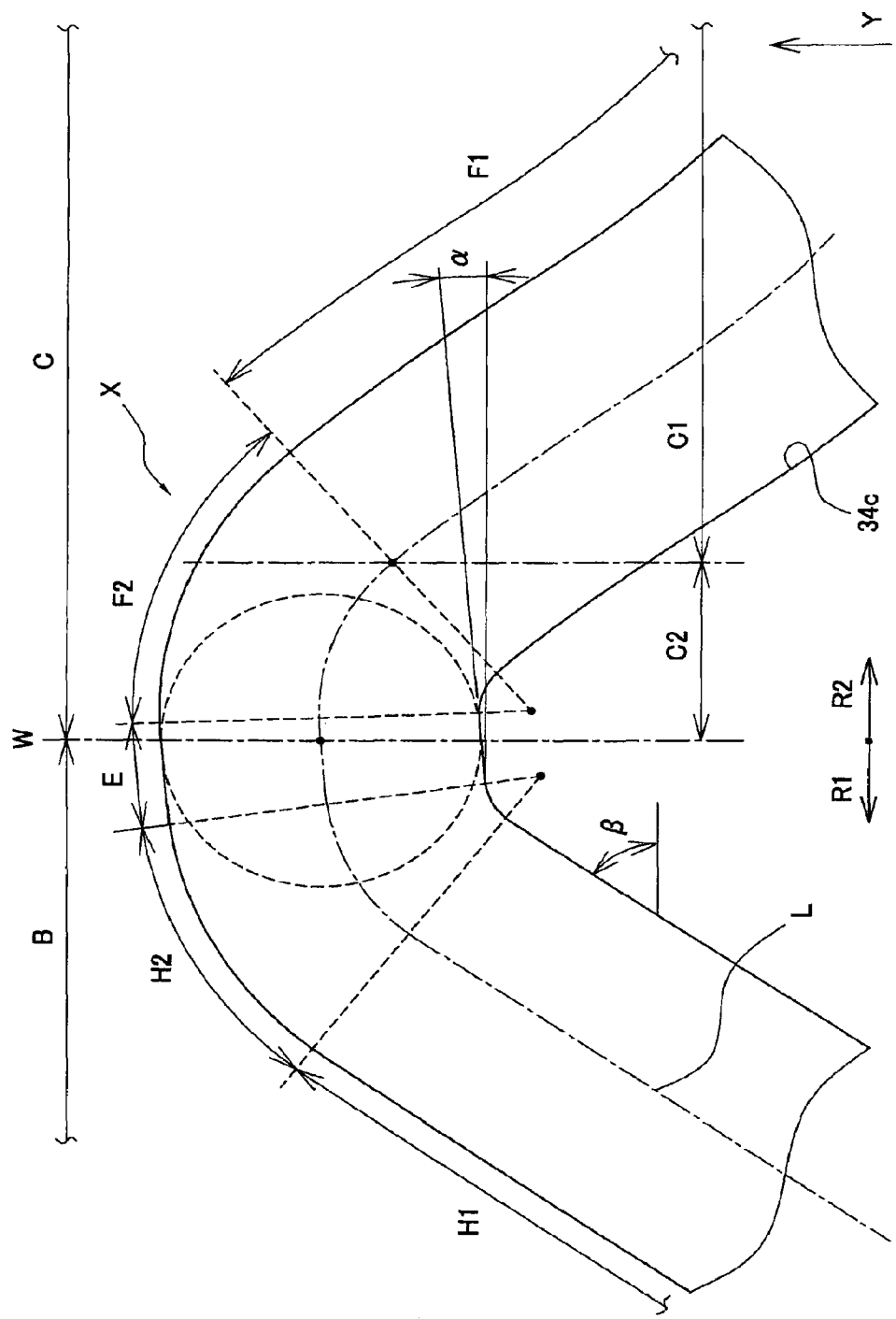
FIG. 7 is a detail enlargement of the first cam groove.

The first cam grooves 34c and the second cam grooves 34d of the drive frame 34 will be described through reference to FIGS. 5 to 7. FIG. 5 is a development of the inner peripheral face of the drive frame 34. FIG. 6 is a development of the first cam grooves 34c. FIG. 7 is a detail enlargement of the first cam grooves 34c.

The lens barrel 3 is retracted into the camera main body 2 in its retracted state when the digital camera 1 is not in use, but during imaging it is deployed from the camera main body 2 to its imaging state. In this imaging state, the drive frame 34 protrudes from the camera main body 2, and the first lens frame 36 protrudes from the drive frame 34. Therefore, as shown in FIG. 5, the first cam grooves 34c for guiding the first lens frame 36 have a retracted region B used when transitioning from the retracted state to the imaging state, and an imaging region C used during imaging. The retracted region B and the imaging region C use as a reference the center of the cam pins 36b guided by the first cam grooves 34c.

In a state in which the lens barrel 3 is retracted into the camera main body 2 of the digital camera 1, the cam pins 36b are located at a retracted position D of the first cam grooves 34c. In the imaging state in which the lens barrel 3 has been deployed from the camera main body 2, the cam pins 36b are located between a wide-angle position W and a telephoto position T of the first cam grooves 34c. The wide-angle position W corresponds to the wide-angle end of the imaging optical system O. The telephoto position T corresponds to the telephoto end of the imaging optical system O.

The imaging region C has a usable region C1, the wide-angle position W, and a drive limiting region C2. The usable region C1 is a region for varying the magnification of the imaging optical system O within the desired range of optical performance, and includes the telephoto position T. The drive limiting region C2 is a region provided between the wide-angle position W and the usable region C1. In other words, the drive limiting region C2 is the region around the wide-angle position W in the imaging region C, and is on the telephoto position T side of the wide-angle position W. That is, the wide-angle position W is not included in the drive limiting region C2.

In the drive limiting region C2, the drive of the drive frame 34 is limited as discussed below. The rotational angle of the drive frame 34 corresponding to the drive limiting region C2 is set, for example, to be greater than the minimum rotational angle of the drive frame 34. This minimum rotational angle is determined by the specifications of the drive system, such as the first motor driver 26 or the zoom motor 32.

If we use the center of the cam pins 36b as a reference, the first cam grooves 34c can be divided into the above-mentioned regions, but if we use the shape of the first cam grooves 34c as a reference, the first cam grooves 34c can instead be divided into the following regions.

As shown is FIG. 7, the first cam grooves 34c have a first region H1 formed so as to include the retracted position D, an inclined region E formed so as to include the wide-angle position W, a second region F1 formed so as to include the telephoto position T, a first curved region H2 that connects the first region H1 and the inclined region E, and a second curved region F2 that connects the second region F1 and the inclined region E.

The first region H1 is used when the lens barrel 3 transitions from its retracted state to its imaging state, and accounts for the majority of the region included in the retracted region B in the first cam grooves 34c. Since the first region H1 is inclined with respect to the rotational direction, when the drive frame 34 rotates with respect to the first lens frame 36, the cam pins 36b are guided along the first region H1. As a result, the first lens frame 36 moves in the Y axial direction with respect to the drive frame 34.

The inclined region E is a substantially linear region formed straddling the retracted region B and the imaging region C. The inclined region E serves to guide the cam pins 36b so that the first lens frame 36 will move in a direction along the optical axis A with respect to the drive frame 34, and is inclined somewhat with respect to the rotational direction. More specifically, the inclined region E is inclined so that it will guide the cam pins 36b to the Y axial direction positive side (subject side) from the retracted region B to the imaging region C. The inclination angle α of the inclined region E with respect to the rotational direction is 5 degrees, for example. This inclination angle α is smaller than the inclination angle β, of the first region H1 with respect to the rotational direction. When stopped at the wide-angle position W, the cam pins 36b are mainly supported in the Y axial direction by the inclined region E of the first cam grooves 34c, but since the inclined region E is inclined with respect to the rotational direction, the cam pins 36b are also supported somewhat in the rotational direction.

The second region F1 is used when changing the focal distance of the imaging optical system O, and accounts for the majority of the region included in the imaging region C in the first cam grooves 34c. The shape of the second region F1 is determined on the basis of the optical design so that the imaging optical system O will satisfy the desired optical performance.

The second region F1 includes the usable region C1, and if we consider the center of the cam pins 36b as a reference, the second region F1 extends more to the wide-angle position W side than the usable region C1. As shown in FIG. 7, in this embodiment the central part of the second region F1 is curved so as to protrude to the Y axial direction negative side.

The first curved region H2 is included in the retracted region B, just as is the first region H1, and smoothly connects the first region H1 and the inclined region E. Therefore, the first curved region H2 curves in an approximate arc shape.

The second curved region F2 is included in the imaging region C, just as is the second region F1, and smoothly connects the inclined region E and the second region F1. Therefore, the second curved region F2 curves in an approximate arc shape. The second curved region F2 is disposed on the telephoto position T side of the wide-angle position W. The second curved region F2 is included in the drive limiting region C2. The first curved region H2, the inclined region E, and the second curved region F2 form a curved part X.

Thus, the first cam grooves 34c are such that their portion (curved part X) around the wide-angle position W, which is the boundary between the retracted region B and the imaging region C, curves gently.

5.2: Comparison of Shape of Conventional Cam Grooves

Figure 8:
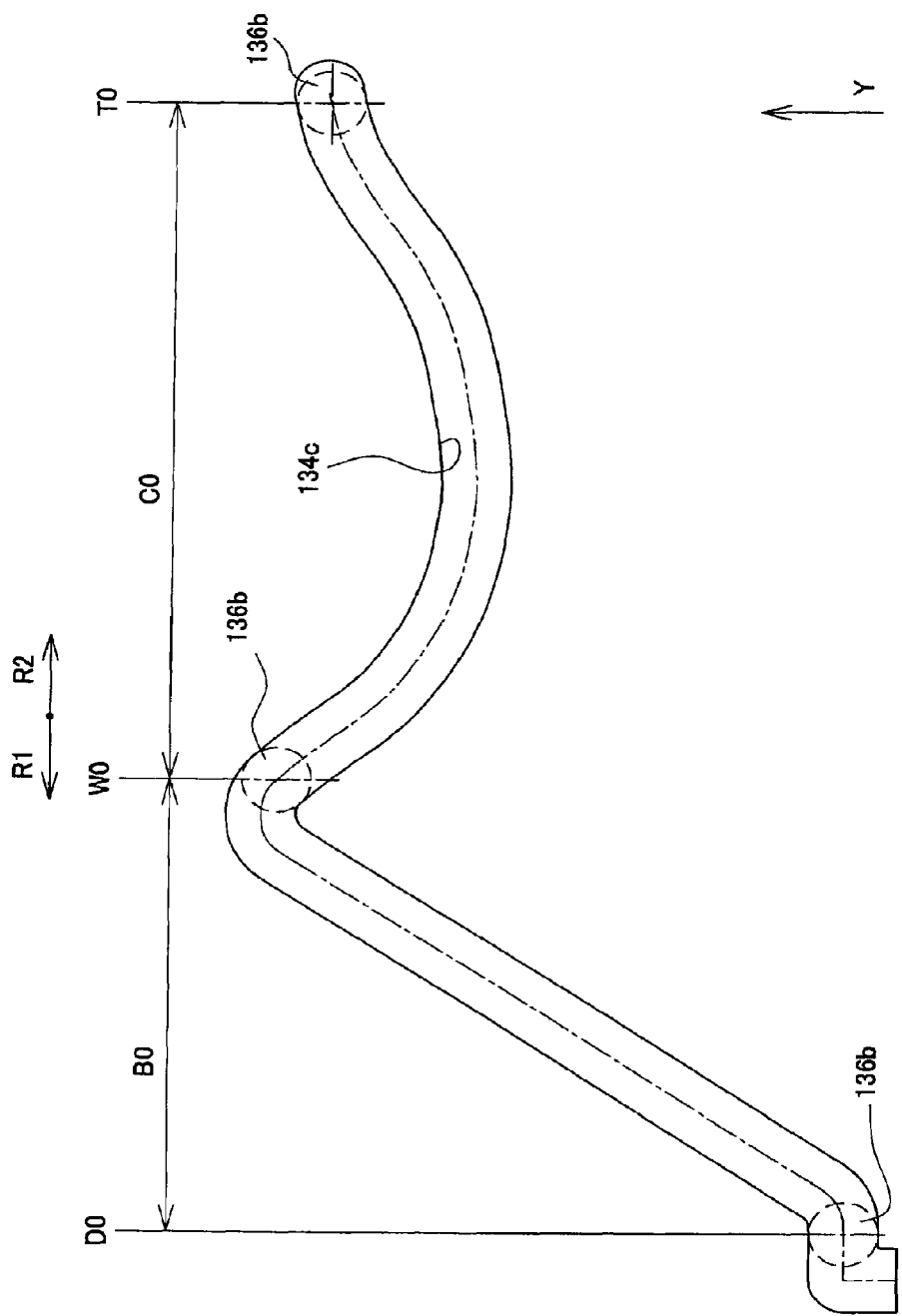
FIG. 8 is a development of a conventional cam groove.
Figure 9:
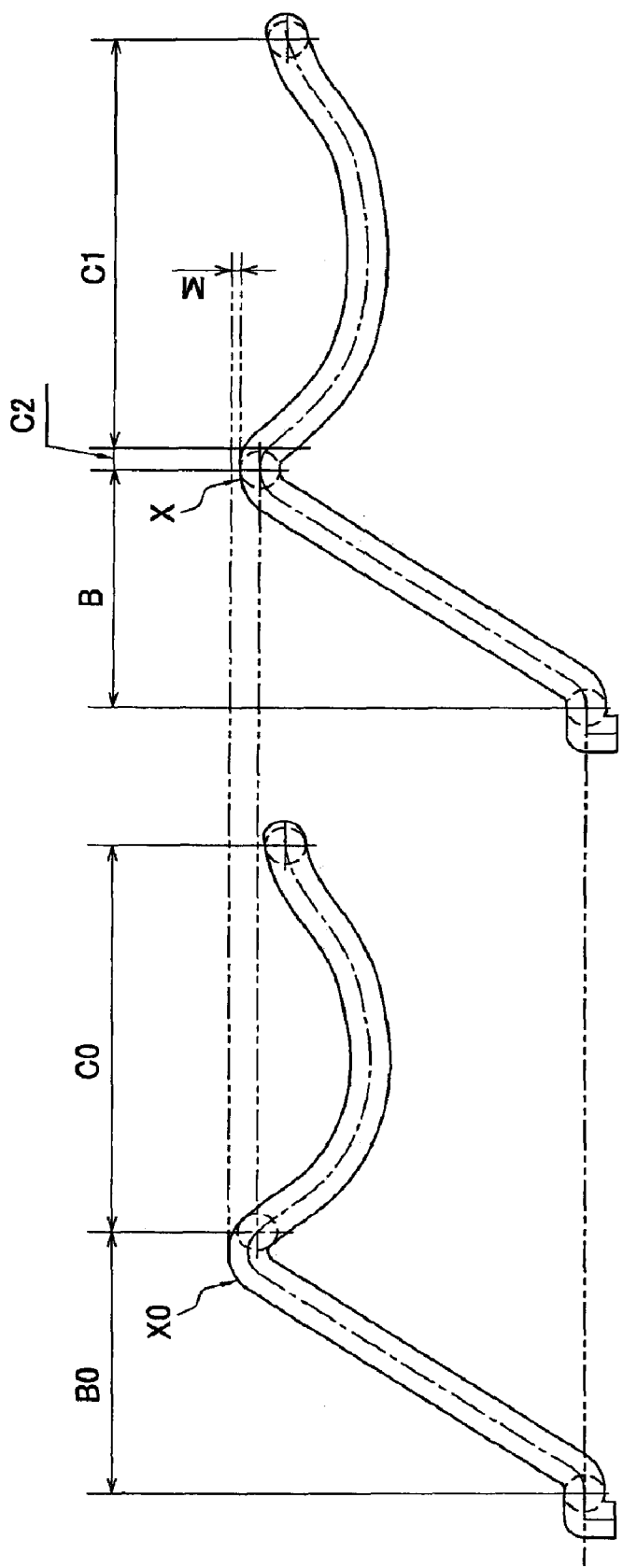
FIG. 9 is a comparison of a conventional cam groove with the first cam groove of the drive frame.
Figure 10:
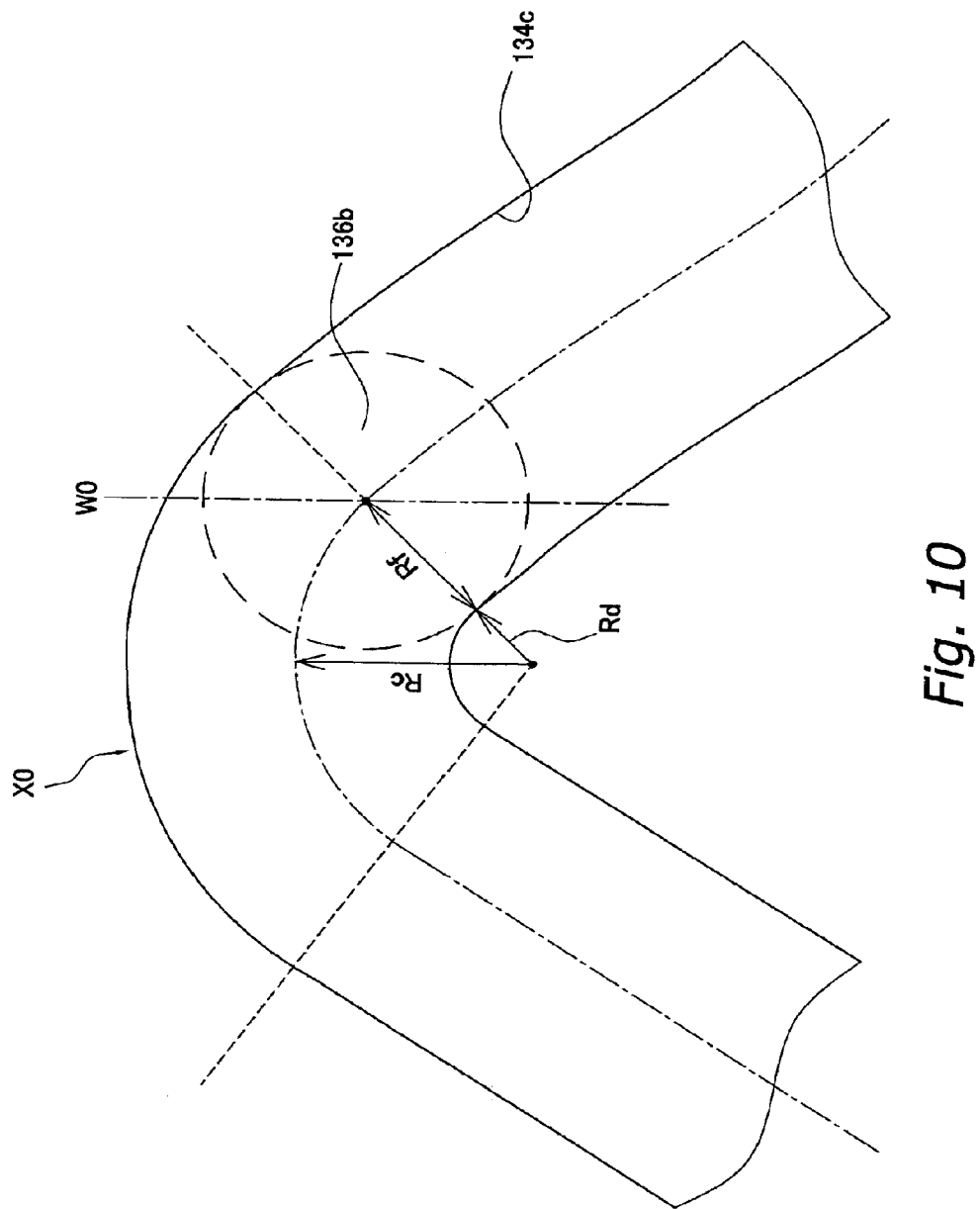
FIG. 10 is a detail enlargement of a conventional cam groove.
Figure 11:
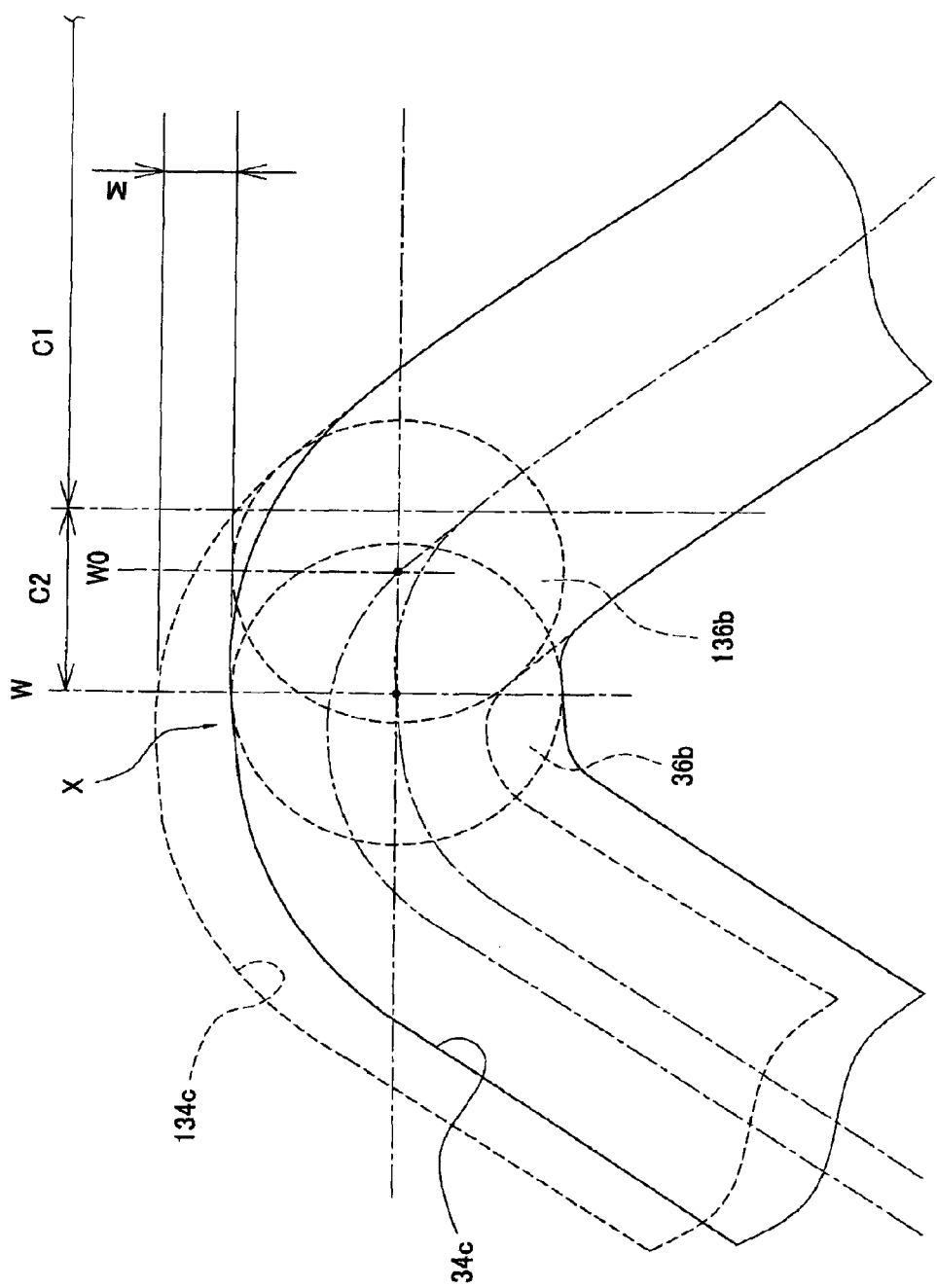
FIG. 11 is a comparison of a conventional cam groove with the first cam groove of the drive frame (detail enlargement)

We will now describe the differences between the shape of the first cam groove 34c and the shape of a conventional cam groove through reference to FIGS. 8 to 11. FIG. 8 is a development of a conventional cam groove 134c. FIG. 9 is a development of the conventional cam groove 134c and the first cam groove 34c. FIG. 10 is a detail enlargement of the conventional cam groove 134c. FIG. 11 is a comparison of the conventional cam groove 134c and the first cam groove 34c.

As shown in FIG. 8, the conventional cam groove 134c has a retracted region B0 used during transition from the retracted state to the imaging state, and an imaging region C0 used during imaging. The retracted region B0 and the imaging region C0 use as a reference the center of cam pins 136b guided by the first cam grooves 134c. Just as with the first cam grooves 34c, the first cam grooves 134c have a retracted position D0, a wide-angle position W0 and a telephoto position T0. The retracted position D0, wide-angle position W0, and telephoto position T0 respectively correspond to the retracted position D, the wide-angle position W, and the telephoto position T of the first cam grooves 34c.

In general, when the lens barrel transitions from its retracted state to its imaging state, the lens barrel is deployed from the retracted state and stops at the wide-angle end of the imaging optical system O. In terms of optical design, the imaging region C0 of the first cam grooves 134c gas a curved shape that protrudes to the Y axial direction negative side. Accordingly, as shown in FIGS. 9 and 10, the portion of the cam groove 134c around the wide-angle position W0 inclines to the Y axial direction negative side moving toward the R2 side. In this case, the end of the retracted region B0 on the imaging region C0 side has a small curve. For example, as shown in FIG. 10, the relationship between the radius Rf of the cam pins 136b, the radius Rc of the path of the center of the cam pins 136b, and the radius Rd of the curved part X0 is expressed by the following formula 1.

$$Rc=Rf+Rd \quad (1)$$

Therefore, the cam pins 136b must move in the optical axis direction outside of the region necessary for changing the focal distance in the curved part X0.

As shown in FIG. 9, the retracted position D and the telephoto position T in the first cam groove 34c coincides with the retracted position D0 and the telephoto position T0 in the first cam groove 134c, but the wide-angle position W in the first cam groove 34c does not correspond to the wide-angle position W0 in the first cam groove 134c. More specifically, as shown in FIG. 10, the wide-angle position W in the first cam groove 34c disposed more to the retracted position D side (R1 side) than the wide-angle position W0.

However, the position in the Y axial direction of the cam pins 36b at the wide-angle position W is the same as the position in the Y axial direction of the cam pins 136b at the wide-angle position W0. Therefore, compared to the path of the cam pins 136b, the path of the cam pins 36b traces a gentle curve in the drive limiting region C2. That is, it can be said that the optical performance of the imaging optical system O is not maintained in the drive limiting region C2.

On the other hand, since the wide-angle position W is disposed more to the retracted position D side than the wide-angle position W0, the second curved region F2 is disposed more to the telephoto position T side (R2 side) than the wide-angle position W. In this case, compared to the first cam groove 134c, with the first cam groove 34c the second curved region F2 is disposed more to the telephoto position T side. As a result, as shown in FIGS. 9 and 11, the curve of the curved part X including the first curved region H2, the inclined region E, and the second curved region F2 is overall more gentle than the curve of a conventional curved part X0. This means that the size of the first cam groove 34c in the Y axial direction is shorter by a length M than the size of the first cam groove 134c in the Y axial direction, and the size of the drive frame 34 in the Y axial direction can be reduced below that in the past. In other words, the lens barrel 3 can be made more compact.

5: Drive Limiting Region

With this digital camera 1, because the first cam grooves 34c have the shape described above, the size of the drive frame 34 in the Y axial direction can be reduced.

However, since the second curved region F2 is provided on the telephoto position T side of the wide-angle position W, there is the possibility that no region will satisfy the desired optical performance within the imaging region C.

In view of this, with this digital camera 1, the drive region of the zoom motor 32 is limited by the control device 30 so that the drive limiting region C2 in which the second curved region F2 is disposed is not used. More specifically, as shown in FIG. 7, operation of the zoom motor 32 is limited by the microprocessor 24 of the control device 30 so that the cam pins 36b do not stop in the drive limiting region C2.

For example, if the zoom adjusting lever 14 is moved to the telephoto side when the cam pins 36b are disposed at the wide-angle position W, the drive frame 34 is driven to the R1 side by the zoom motor 32. As a result, the cam pins 36b move along the first cam grooves 34c to the R2 side, and the cam pins 36b are guided by the second curved region F2 to the Y axial direction negative side. Here, the encoder 23 is used by the microprocessor 24 to monitor the rotational angle of the drive frame 34. Therefore, if the rotational angle of the drive frame 34 based on the amount of operation of the zoom adjusting lever 14 is smaller than the angle corresponding to the drive limiting region C2, then the drive of the zoom motor 32 is limited by the microprocessor 24 via the first motor driver 26 so that the rotational angle of the drive frame 34 will be the same as the angle corresponding to the drive limiting region C2. This prevents the cam pins 36b from stopping within the drive limiting region C2.

Also, when the cam pins 36b are disposed in the usable region C1, for example, if the zoom adjusting lever 14 is operated to the wide-angle side, the drive frame 34 is driven to the R2 by the zoom motor 32. As a result, the cam pins 36b move along the first cam grooves 34c to the R1 side, and the cam pins 36b are guided by the second curved region F2 to the Y axial direction positive side. Here, the encoder 23 is used by the microprocessor 24 to monitor the rotational angle of the drive frame 34. Therefore, if the drive frame 34 is driven on the basis of the amount of operation of the zoom adjusting lever 14, and it is determined that the cam pins 36b have stopped within the drive limiting region C2, then the rotational angle of the drive frame 34 is determined by the microprocessor 24 so that the cam pins 36b will stop at the wide-angle position W. Drive of the zoom motor 32 by the first motor driver 26 is controlled based on a command from the microprocessor 24, and the cam pins 36b are prevented from stopping within the drive limiting region C2.

Thus, with this digital camera 1, even when the first cam grooves 34c have the shape described above, the drive limiting region C2 that does not satisfy the desired optical performance can be prevented from being used during imaging, which allows the camera to be smaller without sacrificing the desired optical performance.

6: Operation of Digital Camera

The operation of the digital camera 1 will be described through reference to FIGS. 1 to 7.

6.1: When the Power is Off

When the power switch 13 is in its off state, the lens barrel 3 is stopped in its retracted state (the state in which the size of the lens barrel 3 in the Y axial direction is smallest) so that the lens barrel 3 will fit within the outer size of the camera main body 2 in the Y axial direction. The retracted state of the lens barrel 3 can be ascertained, for example, on the basis of a detection signal from the position sensor 27. When the lens barrel 3 is in its retracted state, the cam pins 36b are located at the retracted position D of the first cam grooves 34c.

6.2: Operation when the Power is on

When the power switch 13 is turned on, power is supplied to the various components, and the lens barrel 3 is driven from its retracted state to its imaging state. More specifically, the drive frame 34 is driven by the zoom motor 32 by a specific angle to the R1 side with respect to the stationary frame 33. As for the imaging state when the power is switched on, for example, the imaging optical system O is set to a wide-angle end state (a state in which the cam pins 36b are located at the wide-angle position W of the first cam grooves 34c). When the drive frame 34 is driven by the zoom motor 32, the drive frame 34 rotates with respect to the stationary frame 33 while moving to the Y axial direction positive side with respect to the stationary frame 33 according to the shape of the cam grooves 33c.

When the drive frame 34 moves straight or rotates with respect to the stationary frame 33, the first lens frame 36 and the second lens frame 37 move along with the drive frame 34 to the Y axial direction positive side with respect to the stationary frame 33. Since rotation of the first lens frame 36 and the second lens frame 37 with respect to the stationary frame 33 is limited by the straight-movement frame 35, the first lens frame 36 and the second lens frame 37 move along with the drive frame 34 to the Y axial direction positive side while moving in the Y axial direction with respect to the 34 according to the shape of the first cam grooves 34c and the second cam grooves 34d. More specifically, as shown in FIG. 5, when the drive frame 34 is rotationally driven by a specific angle, the cam pins 36b move through the first cam grooves 34c from the retracted position D to the wide-angle position W, and the cam pins 37b move through the second cam grooves 34d from the retracted position D5 to the wide-angle position W5.

When the rotation of the drive frame 34 stops, the cam pins 36b and the cam pins 37b stop at the wide-angle position W and the wide-angle position W5, respectively, and movement of the first lens frame 36 and the second lens frame 37 in the Y axial direction also stops. This puts the lens barrel 3 in its imaging state.

As shown in FIG. 7, since the wide-angle position W is disposed in the inclined region E that is inclined with respect to the rotational direction, the cam pins 36b are mainly supported by the inclined region E in the Y axial direction, but are also somewhat supported by the inclined region E in the rotational direction. This stabilizes the location of the first lens frame 36 with respect to the drive frame 34 at the wide-angle position W.

6.3: Zoom Operation During Imaging

When the zoom adjusting lever 14 is operated to the telephoto site in the imaging state, the drive frame 34 is driven by the zoom motor 32 to the R1 side with respect to the 33 according to the rotational angle and operating time of the zoom adjusting lever 14. Here, since the cam pins 43 of the drive frame 34 are guided by the portion of the cam grooves 33c extending in the rotational direction, the drive frame 34 rotates without moving in the Y axial direction with respect to the stationary frame 33. Because of the straight-movement frame 35, the first lens frame 36 and the second lens frame 37 rotate with respect to the drive frame 34 without rotating with respect to the stationary frame 33. As a result, the first lens frame 36 and the second lens frame 37 move in the Y axial direction with respect to the stationary frame 33, and the zoom magnification of the imaging optical system O changes.

Because the imaging optical system O is a zoom optical system, the position of the third lens group G3 is automatically adjusted so that a change in the zoom magnification will not change the imaging distance of the imaging optical system O. More specifically, the third lens group G3 is driven along the optical axis A by the focus motor 39 according to the zoom magnification.

For example, in the imaging state with the power on, the imaging distance is set to infinity, so the microprocessor 24 instructs the second motor driver 25 to produce a control pulse so that the imaging distance will be infinity. The zoom magnification and the position of the third lens group G3 corresponding to the zoom magnification are determined by the optical design, and a table of this data is contained in the microprocessor 24. The microprocessor 24 calculates the position of the third lens group G3, whose imaging distance is infinity, on the basis of the data table and the amount by which the zoom adjusting lever 14 is operated, and sends the second motor driver 25 a command to produce a control pulse so that the third lens group G3 will move to the calculated position. Since the tracking drive of the third lens group G3 is performed in this manner, the imaging distance is maintained at infinity even if the zoom magnification should change.

As discussed above, with this digital camera 1, the cam pins 36b are restricted from stopping in the drive limiting region C2 provided on the telephoto position T side of the wide-angle position W. More specifically, even when the amount of operation of the zoom adjusting lever 14 is less than the angle corresponding to the drive limiting region C2, the drive frame 34 is driven from the wide-angle position W to the R2 side by a rotational angle corresponding to the drive limiting region C2, so that the cam pins 36b do not stop in the drive limiting region C2. This prevents the cam pins 36b from stopping in the drive limiting region C2, and effectively prevents the second curved region F2, for example, from being used during imaging.

When the release button 11 is pressed, the microprocessor 24 acquires contrast information on the basis of a contrast detection method, and the position of the third lens group G3 corresponding to a focussed state is calculated by the microprocessor 24. The third lens group 38 is driven by the focus motor 39 so that the third lens group G3 will move to the focal position. After this, exposure is performed and an image of the subject is acquired by the CCD unit 21.

7: Features

The digital camera 1 and the lens barrel 3 have the following features.

(1)

With this lens barrel 3, since the cam pins 36b are restricted by the microprocessor 24 from stopping in the drive limiting region C2 of the first cam grooves 34c (the portion around the wide-angle position W), even if the shape of the drive limiting region C2 does not satisfy the optical performance of the imaging optical system O, the drive limiting region C2 can be prevented from being used in imaging.

In other words, regardless of the fact that it is on the telephoto position T side of the wide-angle position W, the shape of the imaging region C around the wide-angle position W is not limited by optical design. Therefore, for example, the shape of the imaging region C around the wide-angle position W can be gently curved, regardless of the optical design, and the size of the first cam grooves 34c in the direction along the optical axis A can be reduced. This means that the size of the drive frame 34 can be smaller with this lens barrel 3, so the overall size can be more compact.

(2)

With this lens barrel 3, since the wide-angle position W is provided to the inclined region E, force in both the rotational direction and the direction along the optical axis A acts on the cam pins 36b. As a result, when the drive frame 34 and the first lens frame 36 are stopped at the wide-angle position W, movement of the first lens frame 36 with respect to the drive frame 34 tends to be restricted. In addition, the cam pins 36b are sandwiched by the first cam grooves 34c and the second guide grooves 35d of the straight-movement frame 35. With this configuration, the microscopic gap between the cam pins 36b and the first cam grooves 34c prevents the first lens frame 36 from moving with respect to the drive frame 34 in a stationary state. Specifically, the position of the first lens frame 36 is stabilized with respect to the drive frame 34 and the straight-movement frame 35.

(3)

With this lens barrel 3, the inclination angle α of the inclined region E with respect to the rotational direction is smaller than the inclination angle β of the first region H1 of the retracted region B with respect to the rotational direction, so the state of the imaging optical system O at the wide-angle position W is stabilized, and the size of the drive frame 34 in the direction along the optical axis A can be reduced.

(4)

With this lens barrel 3, since the second curved region F2 is disposed on the telephoto position T side with respect to the wide-angle position W, there is no need to provide a region that is greatly curved in the retracted region B. This means that the inclination angle of the retracted region B with respect to the rotational direction (more specifically, the inclination angle β, of the first region H1) can be reduced, and load on the zoom motor 32 during drive of the drive frame 34 can be lowered.

Also, when the inclination angle β, of the first region H1 is not changed, the distance in the rotational direction from the retracted position D to the wide-angle position W is shorter, and the rotational angle of the drive frame 34 can be smaller. That is, the drive time of the zoom motor 32 is shorter.

Thus, with this lens barrel 3, since the second curved region F2 is disposed on the telephoto position T side with respect to the wide-angle position W, the zoom motor 32 consumes less power.

(5)

With this lens barrel 3, since the size of the first cam grooves 34c in the direction along the optical axis A is substantially the same as the size of the second cam grooves 34d in the direction along the optical axis, the first cam grooves 34c and the second cam grooves 34d can be utilized more effectively, and the size of the drive frame 34 in the direction along the optical axis A can be reduced. This makes it possible for the lens barrel 3 to be made even smaller.

The phrase "the size of the first cam grooves 34c in the direction along the optical axis A is substantially the same as the size of the second cam grooves 34d in the direction along the optical axis" here encompasses a case in which the size of the first cam grooves 34c is the same as the size of the second cam grooves 34d, as well as a case in which the size of the first cam grooves 34c differs from the size of the second cam grooves 34d within a range that still allows the lens barrel 3 to be made smaller.

(6)

Thus, since this digital camera 1 has the lens barrel 3, the desired optical performance can be maintained while the camera is made smaller. In particular, when the direction along the optical axis A coincides with the thickness direction, the digital camera 1 can be made thinner.

8: Other Embodiments

The specific constitution of the present invention is not limited to or by the embodiment given above, and various changes and modifications are possible without departing from the gist of the invention.

(1)

In the above embodiment, the first cam grooves 34c are provided to the inner peripheral face of the drive frame main body 34a, but may instead be provided to the outer peripheral face. At the same time, the first lens frame 36 may be disposed on the outer peripheral side of the drive frame 34, and the cam pins 36b inserted in the first cam grooves 34c.

(2)

In the above embodiment, the drive frame 34 in which the first cam grooves 34c are formed is driven by the zoom motor 32, but the first lens frame 36 having the cam pins 36b may be driven by the zoom motor 32 instead.

(3)

The inclination angle α of the inclined region E is not limited to that in the above embodiment.

GENERAL INTERPRETATION OF TERMS

In understanding the scope of the present invention, the term "configured" as used herein to describe a component, section or part of a device includes hardware and/or software that is constructed and/or programmed to carry out the desired function.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," "member," or "element" when used in the singular can have the dual meaning of a single part or a plurality of parts.

Terms that are expressed as "means-plus function" in the claims should include any structure that can be utilized to carry out the function of that part of the present invention. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A lens barrel for supporting an imaging optical system, comprising:
    a cylindrical first support frame having on an inner or outer peripheral face thereof at least three first guide grooves disposed aligned in the circumferential direction;
    a cylindrical second support frame provided on the inner or outer peripheral side of the first support frame and having at least three first pins inserted in the first guide grooves;
    a drive part configured to produce a relative rotation of the first and second support frames; and
    a control part configured to control the operation of the drive part,
    the first guide grooves having
        a retracted region configured to guide the first pin so that the relative positions of the first and second support frames are changed along the optical axis of the imaging optical system in response to the relative rotation of the first and second support frames, the retracted region including a retracted position at which the overall size of the first and second support frames in a direction along the optical axis is shortest;

a first imaging region disposed adjacent to the retracted region and including a wide-angle position corresponding to the wide-angle end of the imaging optical system, the first imaging region having a substantially linear shape;

a second imaging region configured to guide the first pin so that the relative positions of the first and second support frames are changed along the optical axis in response to the relative position of the first and second support frames, the second imaging region including a telephoto position corresponding to the telephoto end of the imaging optical system; and an unusable region disposed between the first and second imaging regions and coupling the first imaging region to the second imaging region, and the control part configured to limit the drive region of the drive part so that the first pins do not stop in and are driven through the unusable region.

2. The lens barrel according to claim 1,
wherein the first imaging region is inclined with respect to the circumferential direction.

3. The lens barrel according to claim 2, wherein
the retracted region has a first region inclined to the same side as the first imaging region with respect to the circumferential direction, and is configured to guide the first pin so that the relative positions of the first and second support frames are changed along the optical axis in response to the relative rotation of the first and second support frames, and the inclination angle of the first imaging region with respect to the circumferential direction is smaller than the inclination angle of the first region with respect to the circumferential direction.

4. The lens barrel according to claim 2, wherein
the second imaging region further has
a first usable region disposed adjacent to the unusable region, and the first usable region is inclined to the opposite side from that of the first imaging region with respect to the circumferential direction.

5. The lens barrel according to claim 4, further comprising
a cylindrical third support frame provided on the inner or outer peripheral side of the first support frame and having at least three second pins disposed aligned in the circumferential direction, wherein the first support frame has at least three second guide grooves disposed aligned in the circumferential direction and in which the second pins are inserted, and a first maximum dimension by which the first pins move along the optical axis when guided by the first guide grooves is substantially the same as a second maximum dimension by which the second pins move along the optical axis when guided by the second guide grooves.

6. A camera, comprising:
the imaging optical system;
the lens barrel according to claim 5; and
an imaging part configured to convert an optical image formed by the imaging optical system into an image signal.

7. The lens barrel according to claim 1, further comprising
a third support frame provided on the inner or outer peripheral side of the first support frame and having at least three second pins disposed aligned in the circumferential direction, wherein the first support frame has at least three second guide grooves disposed aligned in the circumferential direction and in which the second pins are inserted, and a first maximum dimension by which the first pins move along the optical axis when guided by the first guide grooves is substantially the same as a second maximum dimension by which the second pins move along the optical axis when guided by the second guide grooves.

8. A camera, comprising:
the imaging optical system;
the lens barrel according to claim 7; and
an imaging part configured to convert an optical image formed by the imaging optical system into an image signal.

9. The lens barrel according to claim 2, further comprising
a cylindrical third support frame provided on the inner or outer peripheral side of the first support frame and having at least three second pins disposed aligned in the circumferential direction, wherein the first support frame has at least three second guide grooves disposed aligned in the circumferential direction and in which the second pins are inserted, and a first maximum dimension by which the first pins move along the optical axis when guided by the first guide grooves is substantially the same as a second maximum dimension by which the second pins move along the optical axis when guided by the second guide grooves.

10. A camera, comprising:
the imaging optical system;
the lens barrel according to claim 9; and
an imaging part configured to convert an optical image formed by the imaging optical system into an image signal.

11. The lens barrel according to claim 3, further comprising
a cylindrical third support frame provided on the inner or outer peripheral side of the first support frame and having at least three second pins disposed aligned in the circumferential direction, wherein the first support frame has at least three second guide grooves disposed aligned in the circumferential direction and in which the second pins are inserted, and a first maximum dimension by which the first pins move along the optical axis when guided by the first guide grooves is substantially the same as a second maximum dimension by which the second pins move along the optical axis when guided by the second guide grooves.

12. A camera, comprising:
the imaging optical system;
the lens barrel according to claim 11; and
an imaging part configured to convert an optical image formed by the imaging optical system into an image signal.

13. A camera, comprising:
the imaging optical system;
the lens barrel according to claim 1; and
an imaging part configured to convert an optical image formed by the imaging optical system into an image signal.

14. A camera, comprising:
the imaging optical system;
the lens barrel according to claim 2; and
an imaging part configured to convert an optical image formed by the imaging optical system into an image signal.

15. A camera, comprising:
the imaging optical system;
the lens barrel according to claim 3; and an imaging part configured to convert an optical image formed by the imaging optical system into an image signal.

16. A camera, comprising:
the imaging optical system;
the lens barrel according to claim 4; and
an imaging part configured to convert an optical image formed by the imaging optical system into an image signal.

* * * * *